US008346234B2

(12) United States Patent
Banga et al.

(10) Patent No.: US 8,346,234 B2
(45) Date of Patent: Jan. 1, 2013

(54) SECURE PLATFORM MANAGEMENT WITH POWER SAVINGS CAPACITY

(75) Inventors: Gaurav Banga, Cupertino, CA (US); Ravi Gupta, San Jose, CA (US); Anahit Tarkhanyan, Cupertino, CA (US)

(73) Assignee: Absolute Software Corporation, Vancouver (CA)

( * ) Notice: Subject to any disclaimer, the term of this patent is extended or adjusted under 35 U.S.C. 154(b) by 454 days.

(21) Appl. No.: 12/321,504

(22) Filed: Jan. 21, 2009

(65) Prior Publication Data

US 2010/0120406 A1    May 13, 2010

Related U.S. Application Data

(60) Provisional application No. 61/198,857, filed on Nov. 8, 2008.

(51) Int. Cl.
*H04M 3/00* (2006.01)
(52) U.S. Cl. ............ 455/418; 455/423; 455/67.11; 455/115.1; 455/226.1; 455/513; 455/115.3; 455/161.3; 455/226.2; 455/226.3
(58) Field of Classification Search ............... 455/455, 455/41.2, 552.1, 411, 410, 13.4, 522, 574, 455/127.1, 127.5, 343.5; 370/338, 346
See application file for complete search history.

(56) References Cited

U.S. PATENT DOCUMENTS

| 6,597,929 | B1 * | 7/2003 | Han et al. ............... 455/574 |
| 6,978,149 | B1 * | 12/2005 | Morelli et al. ............ 455/522 |
| 7,792,544 | B2 * | 9/2010 | Vogedes et al. .......... 455/550.1 |
| 2003/0135766 | A1 | 7/2003 | Zyskowski et al. |

| 2004/0064720 | A1 | 4/2004 | Hessel et al. |
| 2004/0203895 | A1 | 10/2004 | Balasuriya |
| 2005/0090267 | A1 | 4/2005 | Kotzin et al. |

(Continued)

FOREIGN PATENT DOCUMENTS

EP    1615347    1/2006

(Continued)

OTHER PUBLICATIONS

International Search Report and Written Opinion dated Jun. 11, 2009 in PCT/IB2009/054936 (11 pages).

(Continued)

*Primary Examiner* — Kamran Afshar
*Assistant Examiner* — Shahriar Behnamian
(74) *Attorney, Agent, or Firm* — Christopher J. Brokaw; Brokaw Patent Law PC

(57) ABSTRACT

An electronic device, for example, a laptop computer includes a processor, a transceiver module, for example, a Bluetooth module and a memory. The memory includes a platform proximity agent, which may be implemented as a series of instructions, which when executed by the processor, causes the processor to receive a Bluetooth signal from a corresponding provisioned Bluetooth device, for example, a cellular telephone. Next, determine whether the received signal exceeds both a strength threshold level and a predetermined time threshold level, where the signal strength and time threshold levels are established when the laptop and a corresponding cell phone are paired during a provisioning process. When the received signal strength and duration both exceed the corresponding policy based thresholds, the laptop enters (or remains in) a full power state with full access to the monitor and the platform. On the other hand, when the received signal strength and duration both fall below (or are less than) the corresponding policy based threshold, the laptop enters (or remains in) a reduced power, or locked state.

20 Claims, 5 Drawing Sheets

U.S. PATENT DOCUMENTS

| | | |
|---|---|---|
| 2007/0152058 A1 | 7/2007 | Yeakley et al. |
| 2007/0178875 A1* | 8/2007 | Rao et al. .................... 455/343.1 |
| 2007/0190939 A1* | 8/2007 | Abel ............................. 455/41.2 |
| 2007/0275671 A1* | 11/2007 | Hwang et al. .................... 455/73 |
| 2008/0207182 A1 | 8/2008 | Maharajh et al. |
| 2009/0059814 A1* | 3/2009 | Nixon et al. .................. 370/254 |
| 2009/0143014 A1* | 6/2009 | Honda et al. ................. 455/41.3 |
| 2009/0163216 A1 | 6/2009 | Hoang et al. |
| 2010/0303051 A1* | 12/2010 | Umeuchi et al. .............. 370/338 |

FOREIGN PATENT DOCUMENTS

| | | |
|---|---|---|
| EP | 1841190 | 10/2007 |
| KR | 20080089915 | 10/2008 |
| WO | WO2008/087409 | 7/2008 |

OTHER PUBLICATIONS

Jason D Recek, Office Action mailed Nov. 16, 2011 in U.S. Appl. No. 12/321,503, filed Jan. 21, 2009.

* cited by examiner

SECURE PLATFORM MANAGEMENT WITH POWER SAVINGS CAPACITY

RELATED APPLICATION

This application claims the benefit of U.S. Provisional Application Ser. No. 61/198,857, filed on Nov. 8, 2008.

The present invention generally relates to electronic devices and, more particularly, to systems and methods for securely managing the accessibility of a portable electronic device as well as remotely controlling the power functionality of the portable electronic device.

BACKGROUND OF THE INVENTION

Electronic devices, for example, laptop computers, palmtop computers, portable communication devices, for example, cell phones, have become common pieces of equipment used in today's mobile workforce. Once limited to the business traveler and the wealthy, laptop computers and cell phones are used by everyone. A positive result of such global use is that productivity has tremendously increased over the years. Mobility, however, has its drawbacks. First, lost or unauthorized access to laptop computers has greatly increased the amount of sensitive information that has been placed into the public domain; not to mention the increased instances of identity theft that resulting from unauthorized access to laptop computers. Second, extending the useful life of the batteries associated with laptop computers has also been an issue. Anyone who has used a laptop for a significant (or sometimes relatively short) period of time knows the frustration of having to carry an extra battery along to prevent the laptop from going into a hibernate or other low-power state at the most inopportune of moments; or the inconvenience of having to bring the power cable and adapter everywhere you go in order to plug the laptop into a nearby outlet.

An exemplary approach used to protect information maintained in computers is to lockup the interface (e.g. prevent access) to the computer after an elapsed period of non-use and requiring the user to enter a password after the laptop has not been used for an elapsed period of time. A drawback with the lockup approach is that an unauthorized person may be able to access sensitive information maintained on the laptop by gaining physical access to the laptop and start using the laptop before the interface is locked. A drawback with the password approach is that the unauthorized accessor or possessor of the laptop may have obtained the password of the authorized owner or user of the laptop without permission or knowledge of the authorized user; thereby, allowing unauthorized access to the laptop.

An exemplary approach used to extend the useable life of a laptop battery includes turning off or otherwise powering down the subsystems after an elapsed period of time. For example, after five minutes of non-use, the monitor will be powered down. After another five to ten minutes (or such other period as provided by the user) of non-use, the hard disk will be powered down. The powering down of subsystems will continue until the laptop is in a completely powered down state. A drawback with such an approach is that there is still a minimum period for which the laptop, and in particular the monitor and hard disk are still powered, but the laptop is not being used; thus, the laptop is still using power even when not being used.

SUMMARY OF THE INVENTION

A platform management device, for example, a cellular telephone controls whether a corresponding provisioned device, for example, a laptop computer may be used by a person in possession of the laptop. Additionally, the platform management device may provide power management functions by causing the monitor of the laptop to be powered on/powered off based, at least in part, on the proximity of the cell phone to the laptop.

A method for controlling an electronic device includes receiving a signal from a provisioned device. This may be accomplished, for example, by the laptop receiving a Bluetooth signal from a corresponding provisioned Bluetooth device, for example, a cellular telephone. Next, a determination is made as to whether the received signal exceeds both a strength threshold level and a predetermined time threshold level. The signal strength and time threshold levels are established by the authorized user when the laptop and a corresponding cell phone are paired during a provisioning process. Thus, the associated security and power saving functionality of the present invention are policy based. If the received signal strength is less than the threshold level for a predetermined period of time (as determined by the user established policy), one of two things occurs: (1) the monitor is forced into locked state, which requires the user to enter a password or provide some other user indicia to the platform in order to unlock the monitor; or (2) the laptop is placed into a reduced power state, resulting from the monitor being powered down as well as the monitor being forced into a locked state. Thus, the platform management method of the present invention provides both platform security as well as power management.

An electronic device, for example, a laptop computer includes a processor, a transceiver module, for example, a Bluetooth module and a memory. The memory includes a platform proximity agent, which may be implemented as a series of instructions, which when executed by the processor, causes the processor to receive a Bluetooth signal from a corresponding provisioned Bluetooth device, for example, a cellular telephone. Next, determine whether the received signal exceeds both a strength threshold level and a predetermined time threshold level, where the signal strength and time threshold levels are established when the laptop and a corresponding cell phone are paired during a provisioning process. When the received signal strength and duration both exceed the corresponding policy based thresholds, the laptop enters (or remains in) a full power state with full access to the monitor and the platform. On the other hand, when the received signal strength and duration both fall below (or are less than) the corresponding policy based threshold, the laptop enters (or remains in) a reduced power, or locked state corresponding to the monitor being forced into a low power state as well as being locked. Thus, when the distance between the cellular telephone or other provisioned platform management device exceeds a predetermined value, the laptop will be placed into a low power state; thereby, providing both security and power savings. When the distance between the cellular telephone or other provisioned platform management device is within the predetermined value, the laptop will be placed into a full power state.

The aforementioned security and power savings capability is provided by a platform proximity agent which is maintained in the laptop computer. The platform proximity agent is implemented as a series of instructions, which when executed by the processor or other suitable controller of the laptop, causes the laptop to perform the security and power savings according to the present invention.

An advantage provided by the present invention is that it provides an enhanced level of security as access to the laptop may be controlled remotely.

Another advantage provided by the present invention is that it provides power savings functionality in that the provisioned laptop powers down high energy components when the cellular phone, or other provisioned device, is remote from the laptop.

A feature of the present invention is that it takes advantage of existing Bluetooth technology to provide security and power savings functionality.

Another feature of the present invention is that is may be used on combination with existing authentication mechanisms to enhance platform security.

BRIEF DESCRIPTION OF THE DRAWINGS

The aforementioned and related advantages and features of the present will become best understood and appreciated upon review of the following detailed description of the invention, taken in conjunction with the following drawings, where like numerals represent like elements, in which.

DETAILED DESCRIPTION OF THE INVENTION

Figure 1:
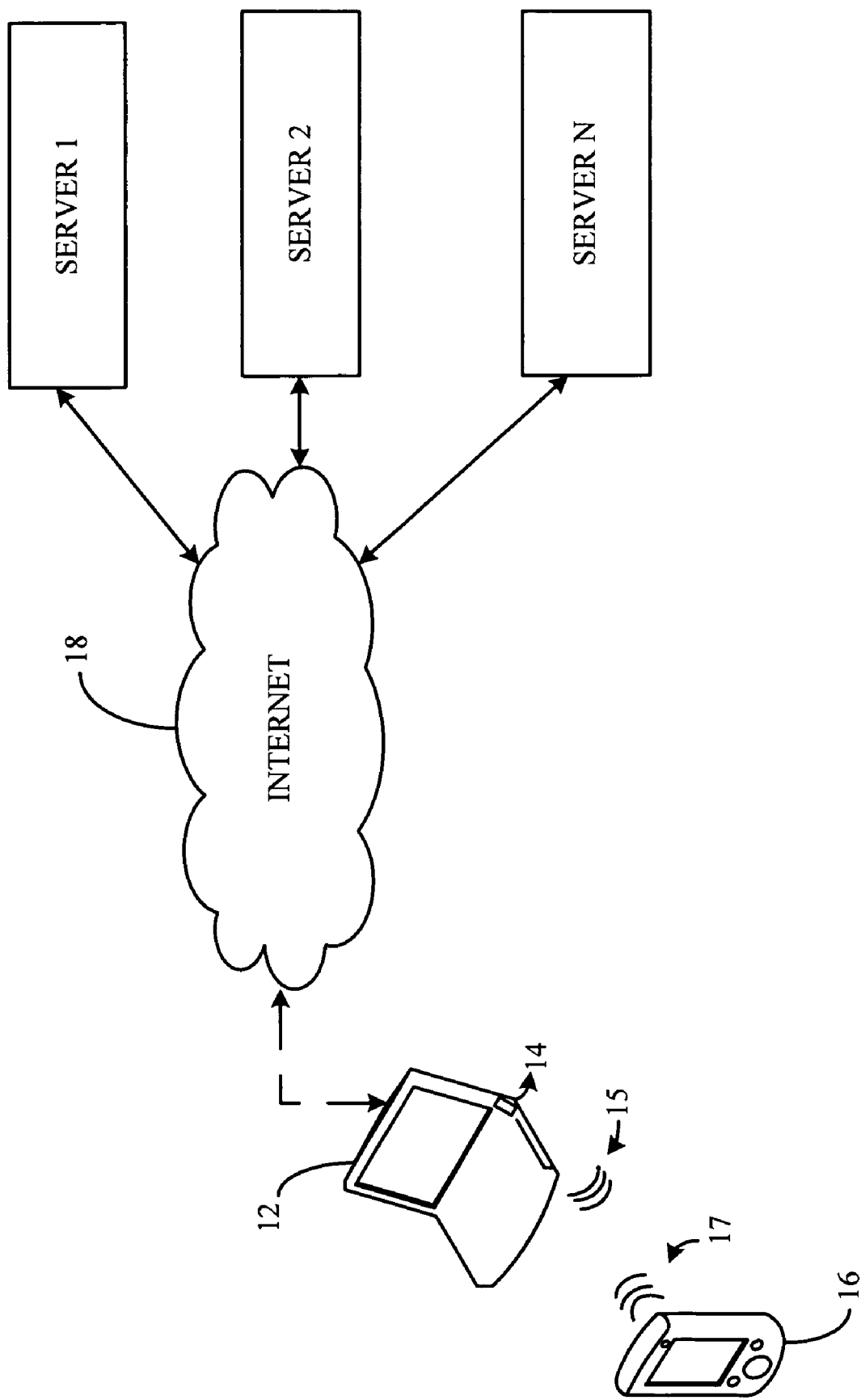
FIG. 1 is a schematic block diagram of a communication architecture including a laptop computer configured with the platform proximity agent of the present invention.

An exemplary embodiment of the present invention will now be described with reference to FIGS. 1-5. Components of applicability and knowledge to those or ordinary skill in the art are not described in great detail so as not to obscure the description. FIG. 1 is a schematic block diagram of a communication architecture including a laptop computer configured with a platform proximity agent of the present invention. As illustrated, an electronic device 12, for example, a laptop computer, a desktop computer, a palm top computer, a server, a portable communication device, for example a cellular telephone, a set top box or other suitable device or combinations thereof configured with the platform proximity agent 14 of the present invention is connected to a network 18, for example, the Internet, a local area network, a wide are network or other suitable network and combinations thereof which can access and transfer information and data with at least one remote server (Server 1-Server N).

The laptop 12 also includes a transceiver, for example, a Bluetooth controller capable of transmitting and receiving Bluetooth signals 15 from a corresponding and provisioned platform management device 16, for example, a cellular telephone. The cellular telephone 16 is configured to send and receive Bluetooth signals 17 to Bluetooth enabled devices. According to the present invention, depending on the distance (e.g. proximity) between the cellular telephone 16 and the laptop 12 as measured by the strength of the received Bluetooth signal (15, 17), the laptop 12 may be placed into one or more operating states based on the policies established by the user at the time the laptop 12 and the cellular telephone 16 were paired according to the present invention. The pairing and policy establishing operations are described in greater detail below in FIGS. 4-5.

Figure 2:
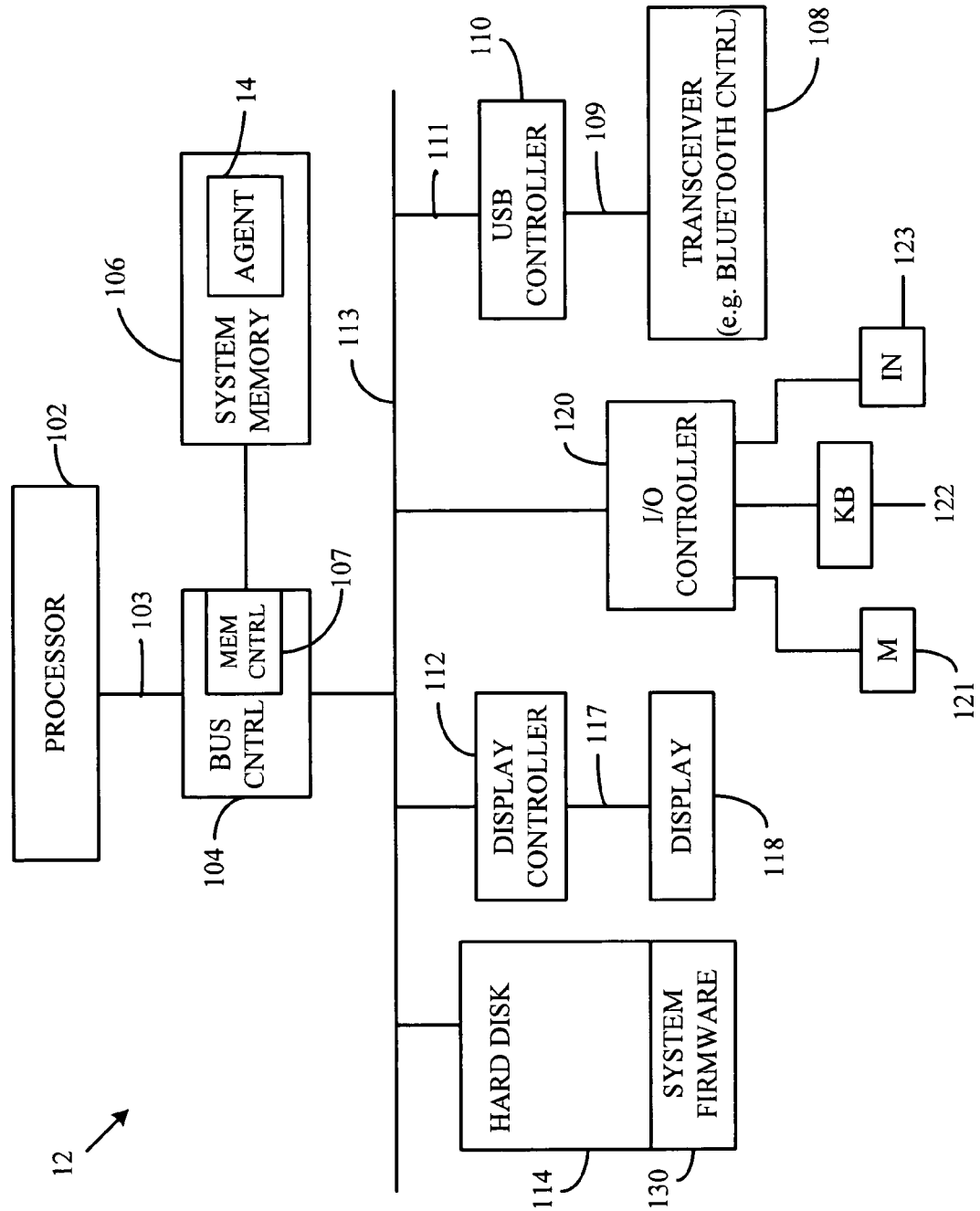
FIG. 2 is a schematic block diagram of the laptop computer configured to work with a provisioned platform management device according to the present invention.

FIG. 2 is a schematic block diagram of an electronic device 12 configured to work with a provisioned platform management device according to the present invention. For purposes of illustration and not limitation, the electronic device 12 is implemented as a laptop computer. However, it will be appreciated by those of ordinary skill in the art, that the electronic device 12 may be implemented as a desktop PC, a tablet PC, a palmtop PC, a PDA, wireless communication device, for example, a cellular telephone, printing devices or other suitable devices or combination thereof. The laptop 12 includes at least one controller or processor 102, configured to control the overall operation of the laptop 12.

The processor 102 may include an arithmetic logic unit (ALU) for performing computations, one or more registers for temporary storage of data and instructions, and a controller for controlling the operations of the laptop 16. In one embodiment, the processor 102 includes any one of the x86, Pentium™, and PentiumPro™ microprocessors manufactured by Intel Corporation, or the K-6 microprocessor marketed by Advanced Micro Devices. The processor 102 is not limited to microprocessors, but may take on other forms such as microcontrollers, digital signal processors, dedicated hardware (e.g. ASIC), state machines or software executing on one or more processors distributed across a network.

The processor 102 is coupled to a bus controller 104 by way of a CPU bus 103. The bus controller 104 includes a memory controller 107 integrated therein. In an alternate embodiment, the memory controller 107 may be separate from the bus controller 104. The memory controller 107 provides an interface for access by the processor 102 or other devices to system memory 106, for example, synchronous dynamic random access memory.

The bus controller 104 is coupled to a system bus 113, for example a peripheral component interconnect (PCI) bus, industry standard architecture (ISA) bus, a wireless connection or other suitable communication medium. Coupled to the system bus 113 is a transceiver 108, a USB controller 110, operative to connect to the system bus 113 via a USB bus 111, a display controller 112, operative to transfer data 117 for display on a corresponding display device 118, for example, a monitor or computer screen, a hard disk 114, and an input/output (I/O) controller 120.

Figure 4:
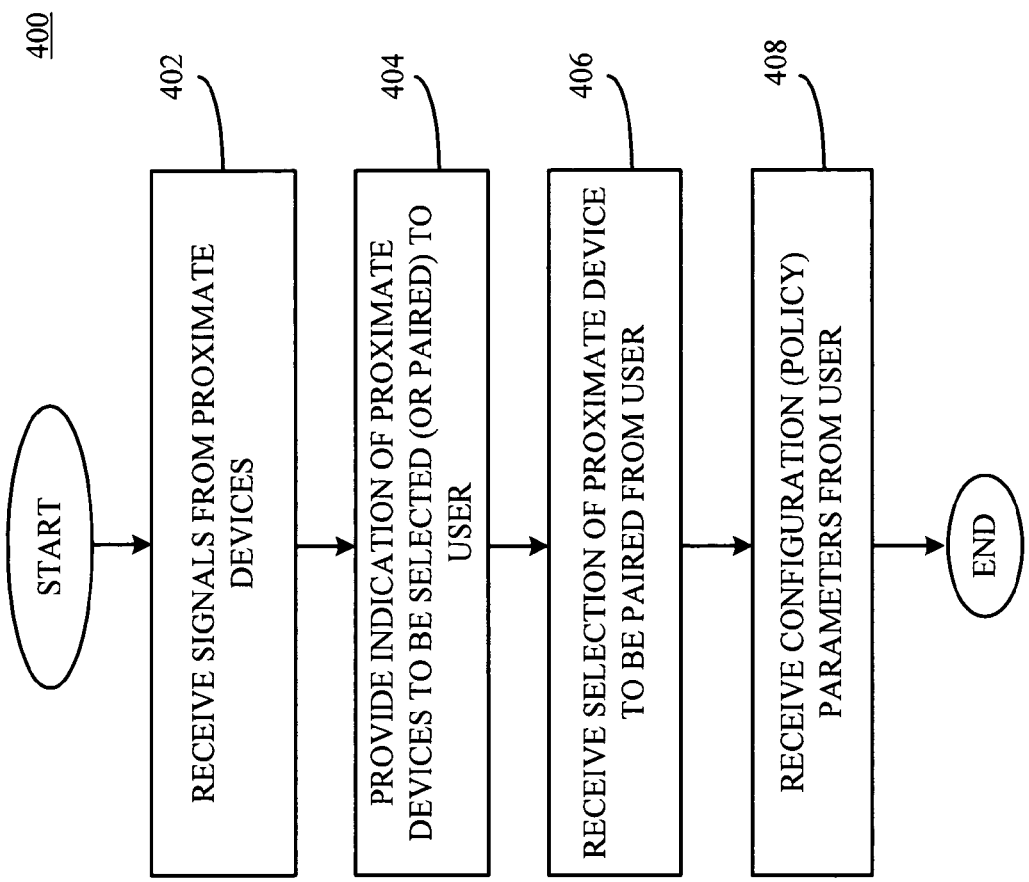
FIG. 4 is a flowchart illustrating the steps performed by the laptop computer when pairing the laptop with a corresponding management device and setting up the security and power savings policies of the provisioned laptop according to the present invention.
Figure 5:
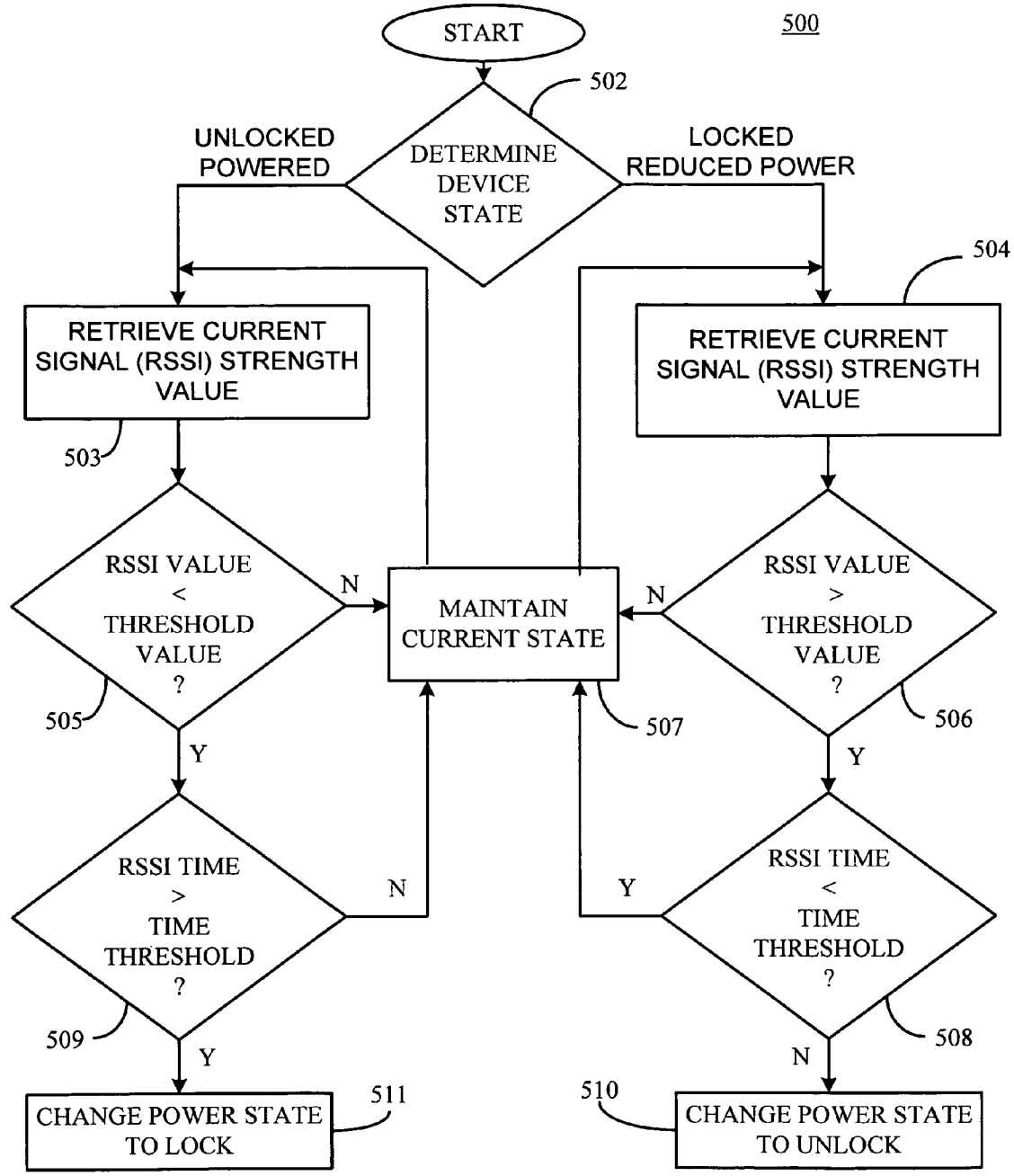
FIG. 5 is a flowchart illustrating the steps performed by the laptop computer when determining what operating state to be placed in according to the present invention.

The system memory 106 includes the platform proximity agent 14 maintained therein which consists of a series of instructions which when executed by the processor 102 causes the processor 102 to perform the policy based platform security and power management operations of the present invention as described in greater detail with respect to FIGS. 4-5. Although described as being maintained in the system memory 106, the platform proximity agent 14 may alternatively be maintained in the system firmware 130 of the laptop 12.

In application, the policy based platform security and power management operations of the present invention may be layered and/or used in combination with existing authentication protocols and systems, for example, biometric authentication, tokens (e.g. smart cards) and passwords; thereby enhancing the security and power management capabilities of an electronic device.

The transceiver 108 may be any suitable device capable of transmitting and receiving data and information over an applicable communication network. For example, the transceiver 108 of the present invention is implemented as a Bluetooth module 108 configured to provide a connection to a Bluetooth network and sending and receiving information thereon. Other data link connection protocols, for example, RFID may also be employed or otherwise utilized by the transceiver 108.

The hard disk 114 may be any suitable non-volatile memory, for example, flash memory. The hard disk 114 maintains the system firmware 130, for example, the BIOS software or other suitable core system software of the laptop 12. The firmware 130 is responsible for, among other things, initializing and configuring the various hardware subsystems, for example, display controller 112, USB controller 110, Input/Output (I/O) controller 120 or other suitable device or series of devices present within, controlled by or otherwise coupled to the laptop 12, and initiates the operating system (OS) boot process.

In addition, the system firmware 130 and/or the platform proximity agent 14 of the present invention may be stored in a processor readable medium or transmitted by a computer data signal embodied in a carrier wave over a transmission medium or other suitable communication link. The processor readable medium may include any medium that can store or transfer information, for example, an electronic circuit, a semiconductor memory device, a ROM, a flash memory, an erasable programmable ROM (EPROM), a floppy diskette, a CD-ROM, an optical disk, a fiber optic medium, a radio frequency (RF) link or other suitable medium. The computer data signal may include any signal that can propagate over a transmission medium, for example, electronic network channels, optical fibers, air electromagnetic, RF links, or other suitable transmission medium. The code segments may be downloaded via computer networks, for example, the Internet, an intranet, LAN, WAN or other suitable network or combinations thereof.

The I/O controller 120 is configured to control the transfer of information between a plurality of input devices, for example, a mouse 121, a keyboard, joystick or other peripheral input device 122 and a biometric sensor 123, for example, a finger print reader, and an applicable output device, for example, a printer (not shown) and transfer of information between the input devices and the processor 102. The I/O controller 120 is also configured to provide information and data to the transceiver 108 for communication to devices remote from the laptop 12.

Figure 3:
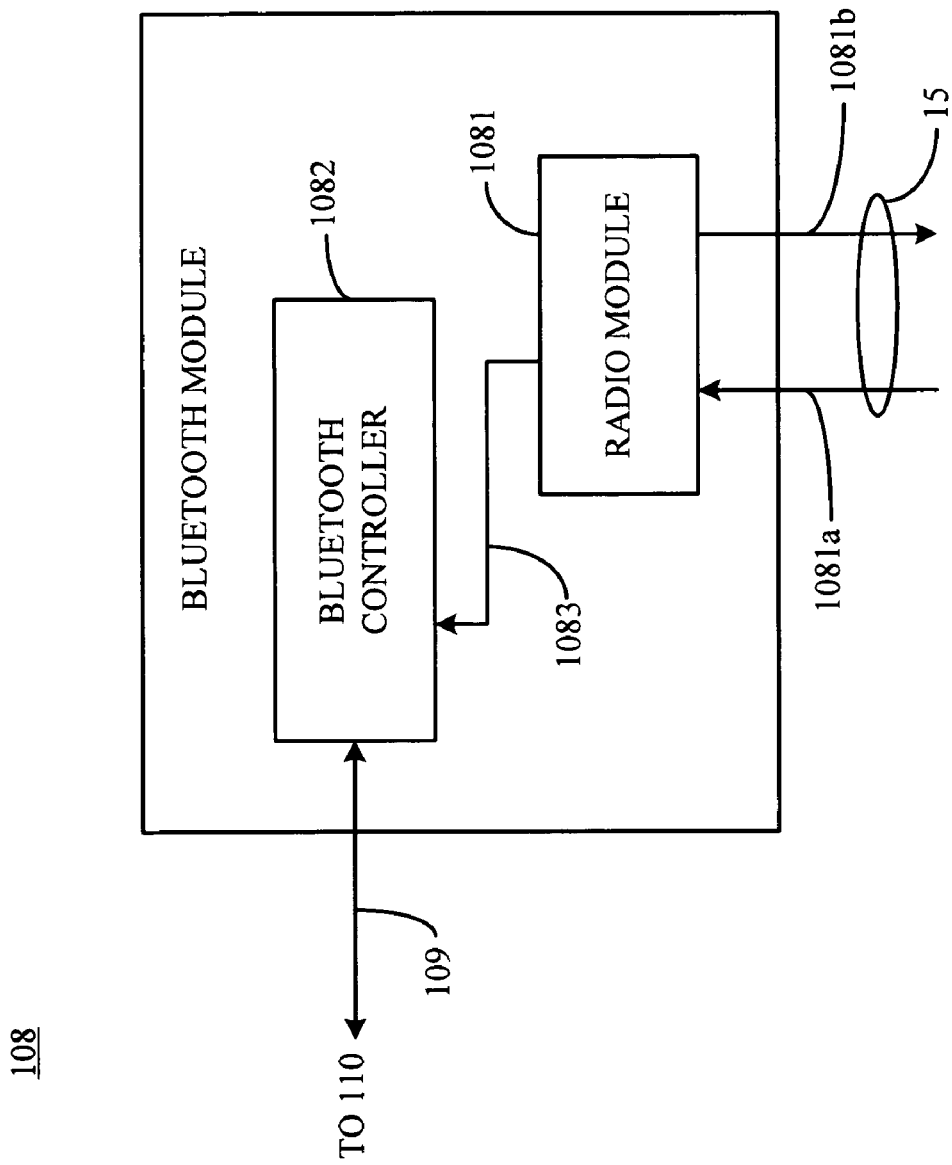
FIG. 3 is an exploded schematic block diagram of the Bluetooth module of the laptop computer illustrated in FIG. 2.

FIG. 3 is an exploded schematic block diagram of the Bluetooth module 108 of the laptop computer 12 of the present invention. The Bluetooth module 108 includes a radio module 1081 configured to receive 1081a and transmit 1081b transmission signals according to the Bluetooth specification. The combined transmit and receive signals are generally referred to and illustrated as a Bluetooth signal 15. The Bluetooth module 108 also includes a Bluetooth controller 1082, which may be implemented as a microcontroller configured to retrieve the received Bluetooth signal 1081a from the radio module 1081 (on line 1083) and determine the signal strength of the received Bluetooth signal 1081a. The strength information may then be transmitted to the USB controller 110 (on line 109) for subsequent presentation to other components of the laptop 12, for example, the processor 102 (FIG. 2) for further processing as discussed in greater detail below with reference to FIGS. 4-5.

FIG. 4 is a flowchart illustrating the steps performed by the laptop when pairing the laptop with a corresponding management device, for example a cellular telephone 16 (FIG. 1) and setting up the security and power savings policies of the provisioned laptop according to the present invention. The process begins at step 402 and continues through step 408. In step 402, transmission signals are received from proximate devices. This may be accomplished, for example, by the platform proximity agent sending out a request signal, through the radio module, and receiving transmission signals from electronic devices within the applicable transmission band. According to the present invention, the transmission signals are Bluetooth signals that include the physical address (es) and the name(s) of the several device(s) that may be in range of the laptop. Thus, step 402 may be accomplished by performing, for example, the signal discovery (or Bluetooth inquiry) process according to the Bluetooth specification.

In step 404, the retrieved information from the several devices in range of the laptop is presented to the user. This may be accomplished, for example, by the several device names and other applicable information being presented to the user on the laptop display.

In step 406, the laptop receives a selection of one of the proximate devices to be paired with from the user. This may be accomplished, for example, by the user selecting one of the devices in range (e.g. by highlighting the selected device) and providing other requested information, for example, a pin code or password parameter on their cellular telephone. The selected device and associated pin code or password parameter are acknowledged through the standard Bluetooth pairing algorithm; thereby, resulting in the laptop and the cellular telephone being paired.

In step 408, the laptop receives configuration (e.g. policy) parameters from the user. Examples, of such configuration parameters include, without limitation or restriction, the maximum and minimum signal strength values which are used to determine the relative proximity of the cellular telephone to the laptop and the maximum and minimum elapsed time threshold values which are used to determine whether the provisioned laptop is maintained in its current power state, forced into a low power state or forced into a full power state based on the policy set by the user. For example, if the laptop computer is in an unlocked and full power (e.g. normal use) state and the received signal is less than the threshold value for a period of time that exceeds the threshold time value, the laptop may be forced into a locked and reduced power state. This corresponds to the monitor being placed into a locked state; which requires the user to enter a password to regain access to the laptop and the monitor being powered down or otherwise being placed into a low power mode. Thus, if the distance between the paired cellular phone and the provisioned laptop exceeds the maximum allowable range, the laptop will be placed in a secure and reduced power state; resulting in both security and power savings.

In corresponding fashion, if the laptop is in a locked and reduced power state and the received signal is greater than the threshold value for a period of time that exceeds the threshold time value, the laptop may be forced into an unlocked and fully powered (e.g. normal) state. This corresponds to the monitor being placed into a full power state.

Although described as being an all or nothing approach to security and power savings, depending on the policy set by the user during the configuration step (408), the laptop may perform a portion of its available functionality. For example, the user may elect to either force the laptop into a high or low power state upon the signal threshold and time threshold values being met or, alternatively, the user may elect to force the laptop into a secure state, for example, requiring the user to enter a password or other indicia of authentication before access is permitted without placing the laptop into a reduced power state. Thus, the security and power savings functionality provided by the platform proximity agent are policy driven.

FIG. 5 is a flowchart illustrating the steps performed by the laptop computer, through the platform proximity agent, when determining what operating state the laptop should be placed in according to the present invention. The method begins at step 502 and proceeds through step 511. In step 502, the laptop operating state is determined. This may be accomplished, for example, by checking a bit in memory to determine the current state of the laptop. For example, if the bit is set, then the laptop is in an unlocked and full powered state. On the on the hand, if the bit is not set, then the laptop is in a locked and reduced power state, including having the monitor locked such that the user will have to enter a password or other indicia of authentication to gain access to the laptop. For purposes of illustration and not limitation, assume the laptop is in a fully powered (e.g. normal) state. The process then moves to step 503.

In step 503 the signal strength (e.g. RSSI) of the paired cellular telephone is retrieved. This may be accomplished, for example, by the Bluetooth controller sending the signal strength value to the platform proximity agent via the USB bus. Alternatively, the Bluetooth controller may periodically (e.g. every 250 msec) retrieve the received transmission (e.g. Bluetooth) signal from the paired cellular telephone and calculate the average of the previous five received signals, and use the calculated average as the signal strength (e.g. RSSI) value. Using an average signal strength value provides the additional advantage of reducing the effects of signal fluctuations when calculating the strength of the received signal. The present invention will work effectively with either the actual received signal or an average of the received signals. Thus, in the discussion below, recitations to the received signals strength can equally refer to a received signal or an average value of the previously received signals.

In step 505, a determination is made as to whether the retrieved signal strength is less than the previously established minimum threshold value. This may be accomplished, for example, by comparing the received signal strength, or average signal strength, with the minimum threshold value stored in an appropriate memory location. If the received signal strength exceeds the minimum threshold value, the process moves to step 507 where the current power state of the laptop is maintained and the currently executing process(es) continue to execute. On the other hand, if the received signal strength is less than the minimum threshold value, the method proceeds to step 509.

In step 509, a determination is made as to how long the received signal strength has been less than the minimum threshold value. If the received signal strength has been less than the minimum threshold value for a period of time that exceeds the minimum time threshold value the method moves to step 511, where the laptop is forced into a lock state. In this situation, depending on the policy set by the user in the provisioning steps one or more of the following operations will be performed: (1) the monitor will be powered down and locked; thereby, requiring the user to enter a password or other form of authentication indicia (e.g. biometric data) to gain access to the laptop as well as conserving laptop battery power; (2) the corresponding operating system of the laptop will be placed into a low power state; (3) after an additional period of time has elapsed, the operating system will be placed in to the S3 (or hibernate) state, resulting in control of the laptop being transferred to the system firmware; and (5) the system firmware will power down the remaining subsystems of the laptop, except for the transceiver (e.g. Bluetooth controller) and a few critical subsystems configured to power up (or wake) the laptop upon the Bluetooth controller detects the paired cellular telephone approaching (via signal strength determination) as described herein.

On the other hand, if the received signal strength has been less than the minimum threshold value for a period of time that is less than the minimum time threshold value the method moves to step 507 where the current state of the laptop is maintained and any currently executing processes will continue to run. In this manner, a user temporarily moving away from the laptop, for example, to get a print job from a nearby printer will not cause the laptop to change operating state.

If it is determined in step 502 that the laptop is in a locked or reduced power state, the method proceeds to step 504 where the signal strength (e.g. RSSI) of the paired cellular telephone is retrieved. This may be accomplished, for example, by the Bluetooth controller sending the signal strength value to the platform proximity agent via the radio module.

In step 506 a determination is made as to whether the received signal strength is greater than the minimum threshold value as set by the user. This may be accomplished, for example, by comparing the received signal strength with the minimum threshold value stored in an appropriate memory location. If the received signal strength does not exceed the minimum threshold value, the process moves to step 507 where the reduced (e.g. current) power state of the laptop is maintained. On the other hand, if the received signal strength is greater than the minimum threshold value, indicating that the user or the paired device is within a predetermined distance of the provisioned laptop, the method proceeds to step 508.

In step 508, a determination is made as to how long the received signal strength has been less than the minimum threshold value. If the received signal strength has been less than the minimum threshold value for a period of time that exceeds the minimum time threshold value the method moves to step 510, where the laptop is forced into an unlocked state. In this situation, depending on the policy set by the user in the provisioning steps, the applicable subsystem power on routine will be executed. For example, the corresponding operating system will be returned from its reduced power state (e.g. returned from low power state), and the monitor will be unlocked and/or powered on; thereby, allowing user access to the laptop. Alternatively, the monitor will be unlocked; thereby, requiring the user to enter a password or other form of authentication before access to the computer is granted.

On the other hand, if the received signal strength has been less than the minimum threshold value for a period of time that is less than the minimum time threshold value the method moves to step 507 where the current (e.g. reduced) power state of the laptop is maintained. In this manner, a secondary consideration (e.g. time) is used to provide an added layer of security against unauthorized access to the laptop.

The foregoing detailed description of the invention has been provided for the purposes of illustration and description. Although an exemplary embodiment of the present invention has been described in, detail herein with reference to the accompanying drawings, it is to be understood that the invention is not limited to the precise embodiment(s) disclosed, and that various changes and modifications to the invention are possible in light of the above teachings. The present invention shall be construed by the claimed provided below.

What is claimed is:

1. A method for controlling an electronic device, comprising:

receiving, from a user, at the electronic device, a policy based rule that includes a minimum threshold signal strength value and a threshold time value, wherein the minimum threshold signal strength value and the threshold time value are specified by the user using the electronic device;

receiving, at the electronic device, a transmission signal from a provisioned platform management device;

the electronic device determining whether the transmission signal strength is less than the minimum threshold signal strength value for a duration of time exceeding the threshold time value; and the electronic device configuring the operating state of the electronic device according to the policy based rule.

2. The method of claim 1, wherein the transmission signal is a Bluetooth signal received from the provisioned platform management device.

3. The method of claim 2, wherein the provisioned platform management device is a cellular telephone.

4. The method of claim 1, wherein configuring the operating state of the electronic device includes one of the following: changing from an unlocked state to a locked state; changing from a locked state to an unlocked state; and maintaining the current state.

5. The method of claim 1, wherein configuring the operating state of the electronic device includes one of the following: changing from a fully powered state to a reduced power state; changing from a reduced power state to a fully powered state; and maintain the current power state.

6. The method of claim 5, wherein the operating state of the electronic device is placed into a fully powered state when the strength of the received signal exceeds the minimum threshold signal value for a corresponding time period that exceeds the minimum time value.

7. The method of claim 5, wherein the operating state of the electronic device is placed into a powered down state when the strength of the received signal is less than the minimum threshold signal value for a corresponding time period that exceeds the minimum time value.

8. An electronic device, comprising:
a processor;
a Bluetooth controller; and
a platform proximity agent, further including a series of instructions, which when executed by the processor, causes the processor to:
receive a Bluetooth signal from the Bluetooth controller,
receive, from a user over the Bluetooth signal, a policy based rule that includes a minimum threshold signal strength value and a threshold time value,
wherein the minimum threshold signal strength value and the threshold time value are specified by the user using the electronic device;
receive, at the electronic device, a Bluetooth transmission signal from a provisioned platform management device;
determine whether the received Bluetooth transmission signal strength is less than the minimum threshold signal strength value for a duration of time exceeding the threshold time value, and
configure the operating state of the electronic device according to the policy based rule.

9. The electronic device of claim 8, further including a memory for maintaining the platform proximity agent.

10. The electronic device of claim 8, wherein the platform proximity agent causes the processor to place the electronic device into a fully powered state when the strength of the received signal exceeds the minimum threshold signal value for a corresponding time period that exceeds the minimum time value.

11. The electronic device of claim 8, wherein the platform proximity agent causes the processor to place the electronic device into a powered down state when the strength of the received signal is less than the minimum threshold signal value for a corresponding time period that exceeds the minimum time value.

12. The electronic device of claim 8, wherein the Bluetooth signal is provided by a provisioned platform management device.

13. The electronic device of claim 12, wherein the provisioned platform management device includes a cellular telephone.

14. A non-transitory computer-readable storage medium storing one or more sequences of instructions, which when executed by one or more processors, causes:
receiving a Bluetooth signal from a Bluetooth controller;
receiving, from a user over the Bluetooth signal, a policy based rule that includes a minimum threshold signal strength value and a threshold time value, wherein the minimum threshold signal strength value and the threshold time value are specified by the user using an electronic device coupled to the processor readable medium;
receiving a Bluetooth transmission signal from a provisioned platform management device;
determining whether the received Bluetooth transmission signal strength is less than the minimum threshold signal strength value for a duration of time exceeding the threshold time value; and
configuring operating state of the electronic device according to the policy based rule.

15. The method of claim 1, wherein the electronic device includes an operating system, and wherein configuring the operating state of the electronic device comprises placing the operating system in a low power state.

16. The method of claim 15, further comprising:
after the operating system has been placed in a low power state, placing the operating system into a hibernate mode such that control of the electronic device is transferred to system firmware executing on the electronic device.

17. The method of claim 1, wherein configuring the operating state comprises powering down a monitor on the electronic device into a secured state.

18. The method of claim 1, wherein the provisioning process comprises:
the electronic device, displaying on a monitor, a list of several devices in range of the electronic device; and
the electronic device receiving, from the user, data that identifies the provisioned platform management device, as being selected by the user from among the list of several devices.

19. The method of claim 1, wherein the steps of the electronic device determining and the electronic device configuring are both performed by a firmware agent executing on the electronic device.

20. The electronic device of claim 8, wherein the platform proximity agent resides in the firmware.

* * * * *